United States Patent [19]
Jessup et al.

[11] Patent Number: 5,938,875
[45] Date of Patent: Aug. 17, 1999

[54] STRUCTURAL BONDING PROCESS WITH ENCAPSULATED FOAMING ADHESIVE

[75] Inventors: Jerry R. Jessup; Richard Perez, Sr., both of Wichita, Kans.

[73] Assignee: The Boeing Company, Seattle, Wash.

[21] Appl. No.: 09/092,498

[22] Filed: Jun. 5, 1998

Related U.S. Application Data

[62] Division of application No. 08/623,434, Mar. 28, 1996, Pat. No. 5,776,579.

[51] Int. Cl.$^6$ .............................. B29C 65/00; B32B 3/12
[52] U.S. Cl. .......................... 156/79; 156/252; 156/292; 156/295; 156/304.2; 156/304.3; 156/304.5
[58] Field of Search .................................. 156/197, 213, 156/217, 281, 293, 295, 304.2, 79, 304.3, 304.5, 91, 252, 292; 264/45.1; 181/288, 292

[56] References Cited

U.S. PATENT DOCUMENTS

| | | | |
|---|---|---|---|
| 4,054,477 | 10/1977 | Curran | 156/197 |
| 4,257,998 | 3/1981 | Diepenbrock, Jr. et al. | 264/156 |
| 4,265,955 | 5/1981 | Harp et al. | 428/116 |
| 4,335,174 | 6/1982 | Belko | 428/73 |
| 5,455,096 | 10/1995 | Toni et al. | 428/116 |
| 5,518,796 | 5/1996 | Tsotsis | 428/116 |
| 5,776,579 | 7/1998 | Jessup et al. | 428/73 |

OTHER PUBLICATIONS

Boeing Process Specification BAC 5514–590, "Bonding With Foaming Adhesives," pp. 1–7, Jul. 1995.
Boeing Process Specification BAC 5514–5137, "Structural Bonding With BMS5–137 Adhesives," pp. 1–12, Dec. 1994.
Boeing Material Specification BMS 5–90M, "Foaming Adhesives," pp. 1–20, Jul. 1995.
Boeing Material Specification BMS 5–137D, "Structural Adhesive For Acoustic Panels –350 F Service," pp. 1–24, Dec. 1994.
Ronald Bliss, Boeing News, "New inlets to diminish decibels of 747 P&W jets," pp. 8, Sep. 1995.

*Primary Examiner*—Blaine R. Copenheaver
*Attorney, Agent, or Firm*—Paul C. Cullom, Jr.

[57] ABSTRACT

An improved panel structure wherein at least one face of the panel is perforated with small holes and where it is desirable to minimize the number of holes that get filled in with adhesive. For example, an improved noise reducing acoustic panel (30) (FIG. 3) constructed of a nonperforated inner skin (14), a perforated outer skin (16) having small holes (18), two sections (12, 12a) of honeycomb core material which are bonded or spliced together by a partially or fully encapsulated foaming adhesive (32e) which has been foamed and expanded, thereby forcing a supported film adhesive (34c) against the walls (24, 24a) of the honeycomb cells in the area of the gap (22) whereby the supported film adhesive (34c) bonds to the walls (24, 24a) of the honeycomb cells in the area of the gap (22). The nonperforated inner skin (14) has been adhesively bonded by a film adhesive to the honeycomb core sections (12, 12a). The perforated outer skin (16) has been adhesively bonded by an unsupported film adhesive to the honeycomb core sections (12, 12a). Encapsulated foaming adhesive (32e) has no horizontal bleed out and it fills a minimum number of the small holes (36, 36a) in the perforated outer skin (16), thereby maximizing the desired noise reducing capability of the acoustic panel (30). As compared to the prior art acoustic panel (10) (FIG. 1), the acoustic panel (30) (FIG. 3) of the invention has a smaller number of filled holes (36, 36a) and a smaller splice width. It also has a neater appearance and a more uniform pattern of filled holes (36, 36a).

1 Claim, 2 Drawing Sheets

STRUCTURAL BONDING PROCESS WITH ENCAPSULATED FOAMING ADHESIVE

This is a divisional of application Ser. No. 08/623,434 filed on Mar. 28, 1996, now U.S. Pat. No. 5,776,579 issued Jul. 7, 1998.

BACKGROUND OF THE INVENTION

1) Field of the Invention

This invention relates to the control of the expansive properties of foaming or foamable adhesives (also referred to as back foam) in cellular core splice applications. This control is accomplished by partially or fully encapsulating the foaming adhesive with a supported film adhesive. This encapsulated adhesive arrangement is then put into the bond assembly between the honeycomb core units to be spliced together. The greatest benefits will be achieved when used in acoustic noise reduction panels where one face skin of the panel is perforated with small holes (for example, the diameter of the small holes may be 0.050 inch) to allow sound waves to enter. For instance, such cellular core splices occur in acoustic noise reduction panels used in airplanes in jet engine nacelle inlets, engine strut panels, thrust reverser blocker doors, and other types of panels where at least one face skin of the panel is perforated with small holes and where it is desirable to minimize the number of holes that get filled in with adhesive and thus become of no value in noise reduction. One goal of this invention is to improve jet airplanes and jet engines in the areas of noise reduction (quiet operation), appearance, and reliability.

2) Description of the Background Art

Foaming adhesives are used on internal structural bond applications where surfaces of metallic or nonmetallic cellular core, such as aluminum honeycomb core or composite honeycomb core, must be bonded together. Due to the ragged and erratic edges inherent in cellular core, adhesives with expansive properties are used to ensure adequate core cell wall coverage. Other adhesives do not expand to cover enough surface area of the erratic core edges. Therefore, an adhesive that will generate its own expansive pressure in the autoclave bonding process is used to accomplish good area coverage of the cell walls with adhesive.

The unique characteristics of foaming adhesives provide beneficial structural bond manufacturing capabilities and widespread applications. However, these manufacturing applications are not without serious consequences. A constant manufacturing concern is keeping foaming adhesives from expanding into places where they are not needed or desired. Such was the case in the development of a new noise reduction jet engine nacelle inlet, where improved appearance, noise reduction, and weight reduction were mandatory. The present invention was developed to enhance the newly designed nacelle inlet by replacing the prior art method of splicing honeycomb core material shown in FIG. 1.

FIG. 1 illustrates a prior art acoustic panel 10 constructed of an nonperforated inner skin 14, a perforated outer skin 16 having multiple small holes 18, two sections of honeycomb core material 12, 12a that are separated by gap 22 and which are adhesively bonded or spliced together by an environmentally durable foaming adhesive 20 that was foamed (by heating) and which thereby expanded and bonded to the walls 24, 24a of the honeycomb cells around the gap 22 that extends transversely across panel 10 in a direction that is perpendicular to the ribbon direction of the honeycomb core material 12, 12a. The cells around gap 22 will hereafter be referred to as the gap cells. Nonperforated inner skin 14 has been adhesively bonded to honeycomb sections 12, 12a by a supported film adhesive (described below) (not shown in FIG. 1). Perforated outer skin 16 has been adhesively bonded to honeycomb sections 12, 12a by an unsupported film adhesive (described below) (not shown in FIG. 1).

FIG. 1 also illustrates that some of foaming adhesive 20 bleeds out vertically thereby filling a large number of holes 28, 28a (which is not desirable) and that it also bleeds out horizontally at 26, 26a (which is also not desirable), thereby partially filling honeycomb cells adjacent the gap cells. Blocked holes 28, 28a in perforated outer skin 16, and covered acoustic septum (in the cells adjacent the gap cells), render both inactive for noise reducing acoustic purposes. For the sake of clarity, the acoustic septum in the cells of the core have been omitted from the present drawings, but it should be understood that acoustic septum are located in the cells of the cellular core. Cellular core with internal acoustic septum are described and shown in Harp et al. U.S. Pat. No. 4,265,955 and Diepenbrock, Jr. et al. U.S. Pat. No. 4,257,998 (both assigned to The Boeing Company, the assignee of the present invention). The splices in prior art acoustic panel 10 made by using uncontained foaming adhesive 20 are often 0.50 inch to 0.75 inch wide and have irregular and ragged patterns of filled holes 28, 28a.

As compared to the prior art acoustic panel 10 (FIG. 1), the acoustic panel 30 (FIG. 3) of the invention has a smaller number of filled holes 36, 36a and a smaller splice width measuring 0.10 inch to 0.15 inch wide. It also has a neater appearance and a more uniform pattern of filled holes 36, 36a.

SUMMARY OF THE INVENTION

This invention involves the encapsulation of a foaming adhesive with a supported film adhesive for the specific purpose of bonding or splicing metallic or nonmetallic cellular core, such as aluminum or composite honeycomb-type cores. The term "cellular core" as used herein refers to core having hexagonal cells (honeycomb core), such as shown in FIGS. 1–3, and to core, such as flex-core, where the cells are not hexagonal in shape.

The foaming adhesive is prepared in strips as usual for the core splice application that is often sandwiched between two face skins. The foaming adhesive is then partially or fully encapsulated with a supported film adhesive. This encapsulated adhesive arrangement is then put into the bond assembly between the honeycomb core units to be spliced together. The greatest benefits will be achieved when used in acoustic noise reduction panels where one face skin is uniformly perforated with small holes.

It should be understood that the invention is not limited to acoustic panels for nacelle inlets but can also be used to make panels used in other areas such as engine strut panels, thrust reverser blocker doors, and other types of panels where at least one face of the panel is perforated with small holes and where it is desirable to minimize the number of holes that get filled in with adhesive.

In one aspect, the invention is an improved panel structure wherein at least one face of the panel is perforated with small holes and where it is desirable to minimize the number of said holes that get filled in with adhesive, the panel being made of: (a) at least two sections of cellular core material separated by a gap; (b) a perforated outer skin, the perforated outer skin being adhesively bonded by a film adhesive to the outer sides of the sections of cellular core material; (c) an encapsulated foaming adhesive unit made of a foaming adhesive partially or fully encapsulated by a supported film adhesive; (d) the encapsulated foaming adhesive unit bonding together the sections of cellular core material, wherein the foaming adhesive has foamed and expanded, whereby the supported film adhesive has been forced against and bonded to the walls of the cells in the gap between the two sections of cellular core material; and, (e) a nonperforated inner skin, the nonperforated inner skin being adhesively bonded by a film adhesive to the inner sides of the sections of cellular core material.

In another aspect, the invention is a process for making an improved panel structure where at least one face of the panel is perforated with small holes and where it is desirable to minimize the number of holes that get filled in with adhesive, the process including the following steps: (a) cutting a rectangular strip of a supported film adhesive and laying the strip on a flat surface; (b) cutting a rectangular strip of a foaming adhesive, laying the strip of foaming adhesive on the strip of supported film adhesive, and folding the supported film adhesive over the foaming adhesive whereby the foaming adhesive is partially or fully encapsulated by the supported film adhesive to form an encapsulated foaming adhesive unit; (c) forming a reticulated adhesive film on one side of a perforated skin using a film adhesive, whereby a reticulated perforated skin is formed; (d) placing a first section of cellular core material on top of the reticulated adhesive side of the reticulated perforated skin; (e) butting the encapsulated foaming adhesive unit against the side to be spliced of the first section of cellular core material; (f) butting a second section of cellular core material against the encapsulated foaming adhesive unit and placing the second section of cellular core material on top of the reticulated perforated skin; (g) placing a sheet of a film adhesive on top of the sections of cellular core material and then placing an nonperforated skin on top of the film adhesive to complete the panel lay-up; (h) vacuum bagging the panel lay-up and drawing a vacuum inside the vacuum bag; (i) heating the bagged panel lay-up in an autoclave to heat and cure the adhesives; and, (j) cooling the autoclave and removing the bagged panel lay-up.

In yet another aspect, the invention is an improved panel structure of the type constructed of at least two sections of cellular core material separated by a gap, a perforated outer skin, the perforated outer skin being adhesively bonded by a film adhesive to the outer sides of the sections of cellular core material, and a nonperforated inner skin, the nonperforated inner skin being adhesively bonded by a film adhesive to the inner sides of the sections of cellular core material, wherein the improvement is: the sections of cellular core material are bonded together by an encapsulated foaming adhesive unit made of a foaming adhesive encapsulated partially or fully by a supported film adhesive, wherein the foaming adhesive has foamed and expanded, whereby the supported film adhesive has been forced against and bonded to the walls of the cells in the gap between the sections of cellular core material.

And in yet another aspect, the invention is in a process for making an improved panel structure of the type constructed of at least two sections of cellular core material separated by a gap, a perforated outer skin, the perforated outer skin being adhesively bonded by a film adhesive to the outer side of the sections of cellular core material, and a nonperforated inner skin, the nonperforated inner skin being adhesively bonded by a film adhesive to the inner side of the sections of cellular core material, wherein the improvement is: bonding together the sections of cellular core material by using an encapsulated foaming adhesive unit comprising a foaming adhesive encapsulated partially or fully by a supported film adhesive, wherein the foaming adhesive foams and expands, whereby the supported film adhesive is forced against and bonds to the walls of the cells in the gap between the sections of cellular core material.

BRIEF DESCRIPTION OF THE DRAWINGS

For a better understanding of the invention, and to show how the same may be carried into effect, for example, in a noise reducing acoustic panel, reference will now be made, by way of illustration, to the accompanying drawings. In the different figures, elements designated by like reference numerals have corresponding functions.

FIG. 1 also illustrates that the foaming adhesive bleeds vertically and horizontally thereby filling and blocking an undesirably large number of the holes in the perforated outer skin of the acoustic panel.

FIG. 3 also shows that the encapsulated foaming adhesive minimized the horizontal and vertical bleed-out and filled only a minimum number of holes in the perforated outer skin of the acoustic panel.

DESCRIPTION OF THE PREFERRED EMBODIMENTS

A Product of the Invention

Figure 2:
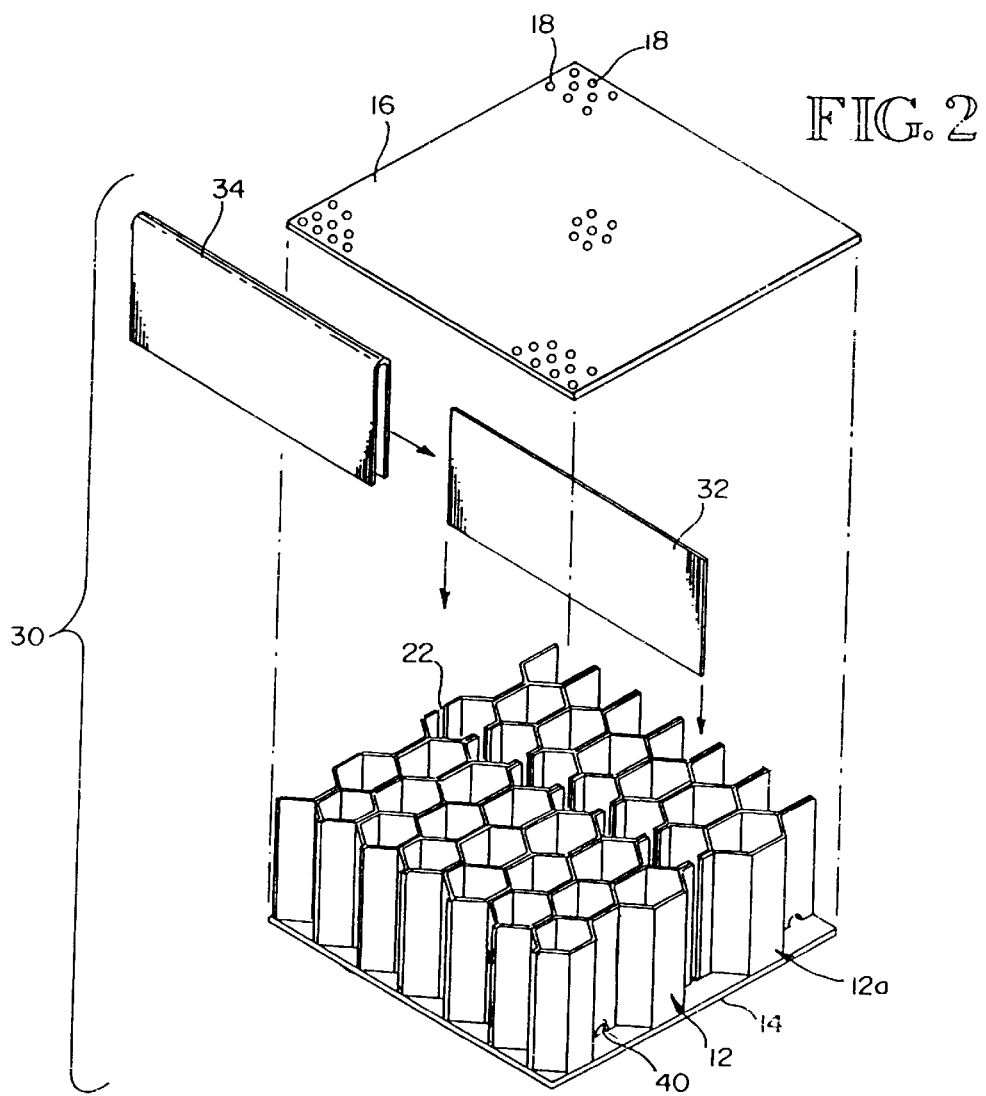
FIG. 2 is an exploded perspective view illustrating the elements in a noise reducing acoustic panel of the invention consisting of an nonperforated inner skin, a perforated outer skin, two sections of honeycomb core material separated by a gap that are to be bonded or spliced together, a rectangular strip of foaming adhesive that has not yet been heated, foamed, and cured, and an inverted U-shaped supported film adhesive that will be used to encapsulate partially or fully the foaming adhesive.

FIG. 2 illustrates the construction of an acoustic panel 30 of the invention constructed of an nonperforated inner skin 14, perforated outer skin 16 having small holes 18 (for example, the diameter of the small holes may be 0.050 inch), two sections of honeycomb core material 12, 12a that are to be adhesively bonded or spliced together, environmentally durable foaming adhesive 32 (uncured) which will later be heated, and supported film adhesive 34 (uncured) which will be used to partially or fully encapsulate foaming adhesive 32 before it is heated. When foaming adhesive 32 is partially or fully encapsulated by supported film adhesive 34, it forms an encapsulated foaming adhesive unit.

Foaming adhesive 32 becomes a foam when heated and cured. Supported film adhesive 34 is a thin film of adhesive (for example, 0.010 inch thick) that has a scrim built into the adhesive.

During a preferred manufacturing process (described below), the partially or fully encapsulated foaming adhesive unit consisting of foaming adhesive 32 and supported film adhesive 34 is heated which simultaneously foams and cures foaming adhesive 32 and also cures supported film adhesive 34.

Nonperforated inner skin 14 is adhesively bonded to honeycomb core sections 12, 12a by a supported film adhesive (not shown in FIG. 2). Perforated outer skin 16 is adhesively bonded to honeycomb core sections 12, 12a by an unsupported film adhesive (not shown in FIG. 2). An unsupported film adhesive is a film adhesive that has no scrim in it.

All adhesives employed in panel 30 are thermosetting adhesives.

Foaming Adhesive

Preferred examples of environmentally durable foaming adhesive 32 are the following products that are qualified under Boeing Material Specification BMS 5-90:

TABLE I

| BOEING MATERIAL CLASSIFICATION | SUPPLIER PRODUCT DESIGNATION | SUPPLIER |
| --- | --- | --- |
| Type III Class 250/350-10-10 | FM 490 100, 50, and 25 mil. | Cytec Industries Cytec Engineered Materials 1300 Revolution Street Havre de Grace, MD 21078 |
|  | MA 562 100, 50, and 25 mil. | B. F. Goodrich Company Adhesive Systems Division 123 West Bartges Street Akron, OH 44311-1081 |
|  | PL 685 100, 50, and 25 mil. | B. F. Goodrich Company Adhesive Systems Division 123 West Bartges Street Akron, OH 44311-1081 |

The nomenclature "Class 250/350-10-10" in Table I has the following meaning. "Class 250/350" signifies that the foaming adhesive is suitable for cure either at 250° F. or 350° F. The first "10" signifies the number of days at or below 90° F. before details shall be completely assembled. The second "10" signifies the number of days of open time at or below 90° F. before cure is initiated.

The most preferred foaming adhesive is one of the adhesives in Table I in the 50 mil thickness.

Supported Film Adhesive

Preferred examples of supported film adhesive 34 (that contain a scrim) are the following products that are qualified under Boeing Material Specification BMS 5-137:

TABLE II

| BOEING MATERIAL CLASSIFICATION | SUPPLIER PRODUCT DESIGNATION | SUPPLIER |
| --- | --- | --- |
| Type II Class 1, Grade 5 | EA 9657 0.060 ± 0.005 lb/sq ft | Dexter Aerospace Materials Division 2850 Willow Pass Road |

TABLE II-continued

| BOEING MATERIAL CLASSIFICATION | SUPPLIER PRODUCT DESIGNATION | SUPPLIER |
| --- | --- | --- |
| Class 1, Grade. 10 | 0.080 ± 0.005 lb/sq ft | Pittsburg, CA 94565 |
| Class 1, Grade 15 | 0.095 ± 0.005 lb/sq ft |  |
| Type II | FM 377S | Cytec Engineered |
| Class 1, Grade 5 | 0.060 ± 0.005 lb/sq ft | Materials, Inc. |
| Class 1, Grade 10 | 0.080 ± 0.005 lb/sq ft | 1300 Revolution Street |
| Class 1, Grade 15 | 0.095 ± 0.005 lb/sq ft | Havre de Grace, MD 21078 |

In Table II, the nomenclature "Type II" signifies film adhesive. The nomenclature "Class 1" signifies supported film adhesive. The nomenclature "Grade 5" signifies a thickness (nominal) of 0.007 inch. The nomenclature "Grade 10" signifies a thickness (nominal) of 0.010 inch. The nomenclature "Grade 15" signifies a thickness (nominal) of 0.012 inch.

The most preferred supported film adhesive in Table II is an adhesive in the 0.080±0.005 lb/sq ft weight.

Unsupported Film Adhesive

Preferred examples of unsupported film adhesives (that do not contain a scrim) are the following products that are qualified under Boeing Material Specification BMS 5-137:

TABLE III

| BOEING MATERIAL CLASSIFICATION | SUPPLIER PRODUCT DESIGNATION | SUPPLIER |
| --- | --- | --- |
| Type II Class 2, Grade 5 | EA 9657 0.055 ± 0.005 lb/sq ft | Dexter Aerospace Materials Division 2850 Willow Pass Road Pittsburg, CA 94565 |
| Type II Class 2, Grade 5 | FM 377U 0.055 ± 0.005 lb/sq ft | Cytec Engineered Materials, Inc. 1300 Revolution Street Havre de Grace, MD 21078 |

In Table III, the nomenclature "Type II" signifies film adhesive. The nomenclature "Class 2" signifies unsupported film adhesive. The nomenclature "Grade 5" signifies a thickness (nominal) of 0.007 inch.

Figure 3:
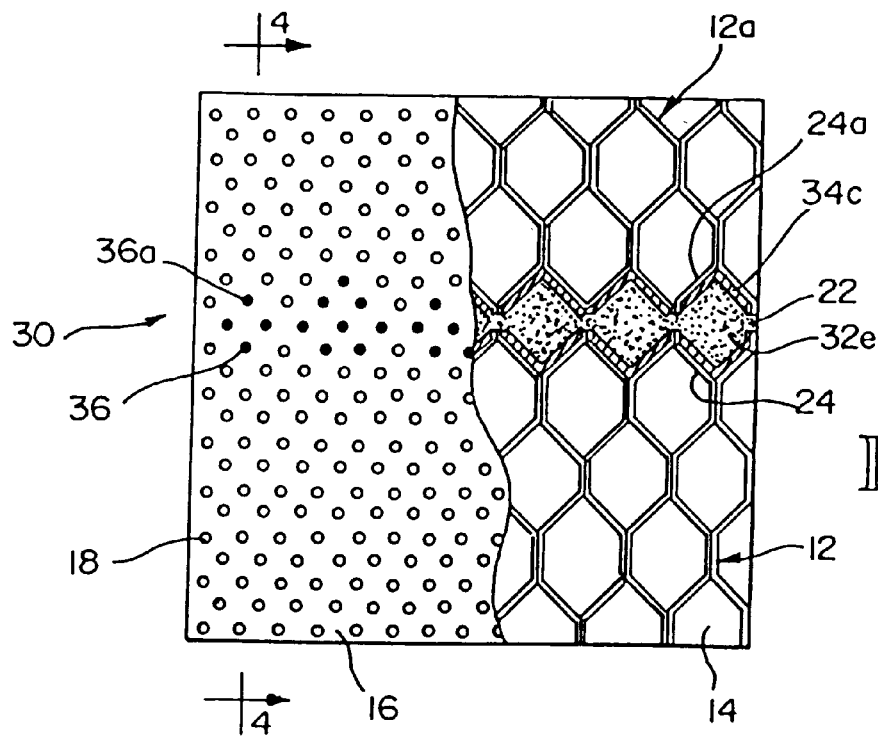
FIG. 3 is a plan view, partially in cutaway, of an assembled noise reducing acoustic panel of the invention having an nonperforated inner skin, a perforated outer skin, two sections of honeycomb core material separated by a gap that are spliced together by a partially or fully encapsulated foaming adhesive that was heated, foamed, and cured, whereby the supported film adhesive was forced to bond with the walls of the honeycomb cells in the area of the gap.

FIG. 3 is a plan view, partially in cutaway, of an assembled noise reducing acoustic panel 30 of the invention constructed of an nonperforated inner skin 14, perforated outer skin 16 having small holes 18, two sections 12, 12a of honeycomb core material which are bonded or spliced together by encapsulated foaming adhesive 32e which has been foamed and expanded, thereby forcing supported film adhesive 34c against walls 24, 24a of the honeycomb cells in the area of gap 22, whereby supported film adhesive 34c bonds to walls 24, 24a of the honeycomb cells in the area of gap 22. Nonperforated inner skin 14 and perforated outer skin 16 have been adhesively bonded to the honeycomb core sections 12, 12a by an unsupported film adhesive (not shown in FIG. 3) by heating and curing. FIG. 3 also shows that partially or fully encapsulated foaming adhesive 32e has no horizontal bleed out and that the vertical bleed out is minimized in that it fills a minimum number of holes 36, 36a in perforated outer skin 16 thereby maximizing the desired noise reducing capability of acoustic panel 30. As compared to the prior art panel 10 in FIG. 1, acoustic panel 30 of the invention has a smaller number of filled holes 36, 36a and a smaller splice width measuring 0.10 inch to 0.15 inch wide. As compared to the prior art panel 10 in FIG. 1, acoustic panel 30 of the invention also has a neater and more uniform pattern of filled holes 36, 36a.

Figure 4:
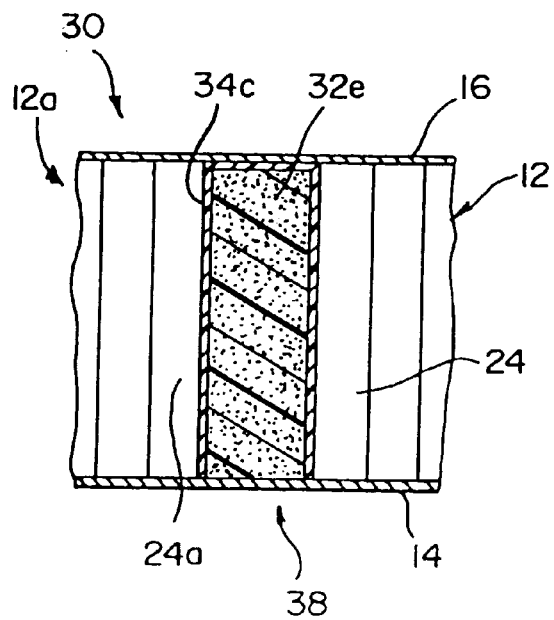
FIG. 4 is a vertical sectional view, taken along line 4—4 of FIG. 3, illustrating a honeycomb cell in the area of the gap and filled with the partially or fully encapsulated foaming adhesive after it was heated, foamed, and cured, whereby the supported film adhesive was forced to bond with the walls of the honeycomb cell in the area of the gap.

FIG. 4 is a vertical sectional view, taken along line 4—4 of FIG. 3, of assembled noise reducing acoustic panel 30 of the invention showing a cell 38 of the honeycomb core at the splice location filled with encapsulated foaming adhesive 32e (now cured) which foamed and forced supported film adhesive 34c (now cured) against walls 24, 24a of honeycomb cell 38.

The Invention Solves Important Problems

Figure 1:
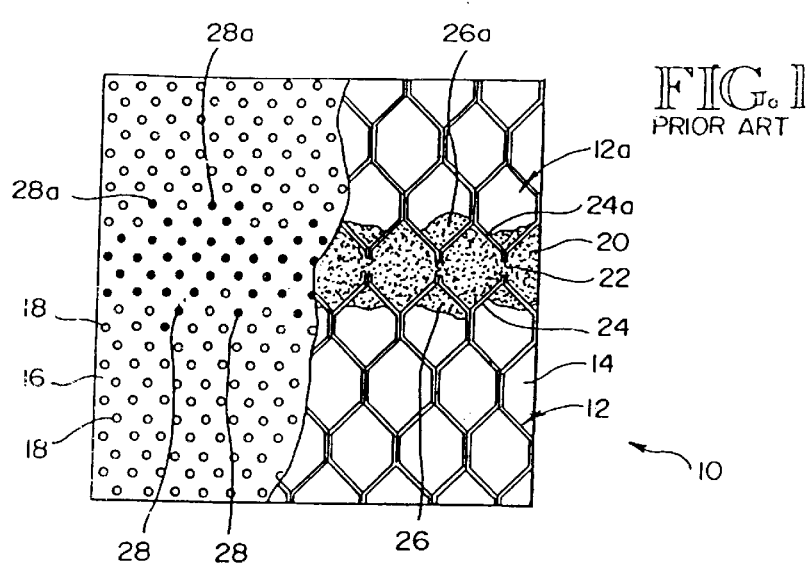
FIG. 1 is a plan view, partially in cutaway, which illustrates a portion of a prior art acoustic panel having an nonperforated inner skin, a perforated outer skin, two sections of honeycomb core material separated by a gap that were spliced together by a foaming adhesive that was foamed, expanded, and bonded to the walls of the honeycomb cells in the area of the gap.

Acoustic panel 30 (FIGS. 2, 3, and 4) of the invention solves two important problems that existed in the prior art acoustic panel 10 (FIG. 1). First, the poor appearance problem is solved. Appearance is enhanced by greatly reducing the amount of foaming adhesive bleed-out into the holes of the perforated outer skin. For example, the appearance of the engine nacelle inlets have been a recent area of airline inspector concern before delivery. The perforated outer skin is the inside of the nacelle inlet and is easily observed by airline inspectors. An appearance improvement is obtained by the present invention due to the reduction of foaming adhesive bleeding through and filling the holes in the perforated skin in the area of the core splices. Prior art honeycomb core splices made by using an uncontained foaming adhesive were often 0.50 inch to 0.75 inch wide and had irregular and ragged pattern of filled holes. The present invention provides a smaller core splice width measuring 0.10 inch to 0.15 inch wide and it also has a more uniform pattern of filled holes.

Second, the performance problem is solved. Inlet noise reduction performance is improved due to significant reductions in the loss of active acoustic lining resulting from excessive bleed out into the holes by the foaming adhesive spreading laterally or horizontally across honeycomb cells at the interface between the perforated skin and the honeycomb core. Blocked holes in the perforated outer skin, and covered acoustic septum (in the cells adjacent the gap cells), render both inactive for acoustic purposes.

This invention also has manufacturing benefits. It contributes to manufacturing process reliability and hardware variability control of inlet acoustic panels. The potential for blockage of water drain channels in the honeycomb core due to core splice bond adhesive flowing into the drain channels and drain slots 40 (FIG. 2) is reduced, if not eliminated. Effectively, this invention reduces the width of the core splice bleed out into the holes of the perforated skin 16 by approximately 0.375 inch and this result is repeatable from unit to unit with current structural bond mechanic skill levels.

This invention was used in a noise reduction nacelle inlet test unit, and is credited with saving three square feet of acoustic treatment from expanded foaming adhesive blockage. Additional applications of the invention are on thrust reverser blocker doors and strut panels. Other small panel pieces throughout the nacelle are high payoff areas for using this invention because of the relatively high ratio of panel core edge bonded to active acoustic surface area. Also, composite structures will benefit from this invention.

As noise restrictions grow ever more stringent, so will the search for new processes and designs. Each decibel of noise reduction is a great achievement, and is usually a result of pushing technology to its limits. The costs associated with implementing this invention in manufacturing nacelle inlets are negligible compared to the cost of other efforts to reduce engine noise and to improve airplane appearance.

A Process of Manufacturing the Invention

A simplified description of a process of manufacturing the invention is as follows. The first step in making an acoustic panel 30 of the invention consists of cutting a rectangular strip of supported film adhesive 34 from a roll or sheet and then laying the strip on a flat surface such as a table. The length and width of the strip will depend on the length and height of the sections of honeycomb core being spliced together. The width of the strip will be about two times the height of the honeycomb core because the strip needs to be folded over a strip of foaming adhesive 32.

The second step is cutting a rectangular strip of foaming adhesive 32 from a roll or sheet and then laying the strip of foaming adhesive on top of the strip of supported film adhesive 34 so that about one-half of the strip of supported film adhesive 34 is overlaid and two corners are in alignment. The length of the strip of foaming adhesive will be the same as the strip of supported film adhesive. The width of the strip of foaming adhesive will be about one-half of the width of the strip of the supported film adhesive. Next the uncovered half of the supported film adhesive 34 is folded over in a U-shape to cover the strip of the foaming adhesive 32 whereby the foaming adhesive 32 is encapsulated by the supported film adhesive 34 (as indicated in FIG. 2) to form an encapsulated foaming adhesive unit.

The third step is to create a thin reticulated adhesive film on one side of perforated skin 16 using a sheet of unsupported film adhesive (see Table III above). The sheet of unsupported film adhesive is laid on one side of perforated skin 16 and heat tacked to the skin using a hot-air gun. The skin is then passed through a reticulator that heats the adhesive and uses a pressurized air knife to blow the adhesive out of the perforations, thus leaving unsupported film adhesive on one side of perforated skin 16. The reticulated adhesive forms a thin film on one side of skin 16, surrounding the perforations, but not in the perforations. The result is a reticulated perforated skin.

The fourth step is to place the first section of honeycomb core on top of the reticulated perforated skin. The reticulated perforated skin is secured horizontally in a jig with the reticulated adhesive side facing up.

The fifth step is to butt the encapsulated foaming adhesive unit against the side to be spliced of the first section of honeycomb core. The encapsulated adhesive unit may be heated with a hot-air gun to make it stick to the honeycomb core. The lower edge of the encapsulated adhesive unit now contacts the reticulated perforated skin and is perpendicular to it.

The sixth step is to butt the next section of honeycomb core against the encapsulated foaming adhesive unit and to place the next section of honeycomb core on top of the reticulated perforated skin. Steps four, five and six will be repeated until the desired number of honeycomb core sections and encapsulated foaming adhesive units are in place to make the acoustic panel.

The seventh step is to place a sheet of supported film adhesive on top of the sections of honeycomb core. Then the nonperforated skin 14 is placed on top of the supported film adhesive. All the elements of the acoustic panel lay-up are now in place. Now the adhesives need to be heated and cured in an autoclave.

The eighth step is to vacuum bag the acoustic panel lay-up and draw a vacuum inside the vacuum bag so that it presses tightly against the acoustic panel lay-up.

The ninth step is to heat the bagged acoustic panel lay-up in an autoclave to heat and cure the adhesives. A preferred process is to pressurize the autoclave to 45 psi and is to increase the temperature in the autoclave at a rate of 2° F. per minute, while checking the temperature rise every ten minutes, until the autoclave reaches 350° F. The autoclave is then held at this temperature for 90 minutes to cure the adhesives. The autoclave is then cooled down to 150° F. before the door is opened and the bagged panel lay-up removed.

The manufacture of the noise reducing acoustic panel 30 (FIG. 3) is now complete. The two thin layers of unsupported film adhesive have been cured. The foaming adhesive 32 has been foamed, expanded, and cured inside the supported film adhesive 34 that has also been cured.

The invention is not limited to acoustic panels for engine nacelle inlets, but can also be used to make other structures such as engine strut panels, thrust reverser blocker doors, and other types of panels where at least one face of the panel is perforated with small holes and where it is desirable to minimize the number of holes that get filled in with adhesive.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A lay-up process for making an improved multi-layered panel structure having at least one face member of the panel perforated with small holes and said perforated face member having a minimum number of said small holes that become filled with adhesive during the lay-up process, said process comprising:

(a) cutting a rectangular strip of a supported film adhesive and laying said strip on a flat surface;

(b) cutting a rectangular strip of a foaming adhesive, laying said strip of foaming adhesive on said strip of supported film adhesive, and folding said supported film adhesive over said foaming adhesive wherein said foaming adhesive is encapsulated on at least three sides by said supported film adhesive to form an encapsulated foaming adhesive unit;

(c) forming a reticulated adhesive film on one side of a perforated face member having small holes therein using an unsupported film adhesive, wherein a perforated face member having a reticulated adhesive film on one side thereof is formed;

(d) placing a first section of cellular core material on the reticulated adhesive side of said perforated face member;

(e) butting said encapsulated foaming adhesive unit against the side to be spliced of said first section of cellular core material;

(f) placing a second section of cellular core material on the reticulated adhesive side of said perforated face member and butting said second section of cellular core material against said encapsulated foaming adhesive unit;

(g) placing a sheet of a film adhesive on top of the sections of cellular core material and then placing a second face member on top of said film adhesive, thereby completing the panel lay-up;

(h) vacuum bagging the panel lay-up and drawing a vacuum inside said vacuum bag;

(i) heating said bagged panel lay-up in an autoclave to heat said adhesives, thereby causing said foaming adhesive to foam and expand against said supported film adhesive, thereby causing said supported film adhesive to expand against said perforated face member, thereby causing a minimum number of said small holes to become filled with said supported film adhesive; and (j) curing said adhesives in said bagged panel lay-up, then cooling said autoclave and removing said bagged panel lay-up.

\* \* \* \* \*